United States Patent
Holz et al.

(10) Patent No.: US 8,496,185 B2
(45) Date of Patent: Jul. 30, 2013

(54) SECURE ID (75) Inventors: John B. Holz, Natick, MA (US); Peter A. Suorsa, Amesbury, MA (US)

(73) Assignee: NCR Corporation, Duluth, GA (US)

( * ) Notice: Subject to any disclaimer, the term of this patent is extended or adjusted under 35 U.S.C. 154(b) by 305 days.

(21) Appl. No.: 12/136,443

(22) Filed: Jun. 10, 2008

(65) Prior Publication Data
US 2009/0179073 A1 Jul. 16, 2009

Related U.S. Application Data (60) Provisional application No. 61/020,158, filed on Jan. 10, 2008.

(51) Int. Cl.
G06F 17/00 (2006.01)
G06Q 40/00 (2012.01)
G06K 5/00 (2006.01)
G06K 7/10 (2006.01)
G06K 19/06 (2006.01)

(52) U.S. Cl.
USPC ........... 235/494; 235/375; 235/380; 235/382; 235/454; 235/491

(58) Field of Classification Search
USPC ................. 235/379, 380, 382, 454, 462.01, 235/491, 494
See application file for complete search history.

(56) References Cited

U.S. PATENT DOCUMENTS

| | | | | |
|---|---|---|---|---|
| 3,786,237 A * | 1/1974 | Postal | | 235/491 |
| 4,833,311 A * | 5/1989 | Jalon | | 235/491 |
| 6,402,986 B1 * | 6/2002 | Jones et al. | | 252/301.16 |
| 7,256,398 B2 * | 8/2007 | Ross et al. | | 250/302 |
| 7,501,646 B2 * | 3/2009 | Ross et al. | | 250/559.39 |
| 2004/0262547 A1 * | 12/2004 | Ross et al. | | 250/556 |
| 2006/0157559 A1 * | 7/2006 | Levy et al. | | 235/380 |
| 2006/0180792 A1 * | 8/2006 | Ricci et al. | | 252/301.16 |
| 2007/0087452 A1 * | 4/2007 | Parker et al. | | 436/518 |
| 2009/0057421 A1 * | 3/2009 | Suorsa et al. | | 235/494 |
| 2009/0203148 A1 * | 8/2009 | Gorfinkel et al. | | 436/94 |

OTHER PUBLICATIONS

AAMVA, "Personal Identification—AAMVA International Specification—DL/ID Card Design", (Mar. 2005).
DHS, "Minimum Standards for Driver's Licenses and Identification Cards Acceptable by Federal Agencies for Official Purposes; Proposed Rule", 6 CFR Part 37, (Mar. 9, 2007).
DHS, "Minimum Standards for Driver's Licenses and Identification Cards Acceptable by Federal Agencies for Official Purposes; Final Rule", 6 CFR Part 37, (Jan. 29, 2008).

* cited by examiner

*Primary Examiner* — Michael G Lee
*Assistant Examiner* — Laura Gudorf
(74) *Attorney, Agent, or Firm* — Howard L. Speight; Peter H. Preist (57) ABSTRACT

A secure identification card is created. The secure identification card includes a first identifying item of information. A first covert marker is applied to the secure identification card. The first covert marker is associated with the first identifying item of information such that the secure identification card is recognized as authentic only if the association between the first covert marker and the first identifying item of information is recognized. The association between the first covert marker and the first identifying item of information is stored at a site that can be used to monitor the use of the secure identification card at a plurality of locations.

17 Claims, 6 Drawing Sheets

FIG. 10 ized.

SECURE ID

This application claims priority from U.S. Provisional Application Ser. No. 61/020,158, entitled "SECURE ID," which was filed on Jan. 10, 2008.

BACKGROUND

At a time when the United States and other countries are on a constant terrorism alert, the authentication of identity documents has taken on an unprecedented level of importance. In addition to screening those crossing U.S. Borders, identity documents are required for access to "secure areas" at airports and seaports. With the advent of modern color copiers and lamination equipment it has become relatively easy to create counterfeits of identity documents.

Typically holograms or color shifting inks have been used as methods of providing authentication to such documents. Other overt and/or covert technologies have been used to attempt to create secure documents.

SUMMARY

In general, in one aspect, the invention features a method for creating a secure identification card. The secure identification card includes a first identifying item of information. The method includes applying a first covert marker to the secure identification card. The method further includes associating the first covert marker with the first identifying item of information such that the secure identification card is recognized as authentic only if the association between the first covert marker and the first identifying item of information is recognized. The method further includes storing the association between the first covert marker and the first identifying item of information at a site that can be used to monitor the use of the secure identification card at a plurality of locations.

Implementations of the invention may include one or more of the following. The secure identification card may include a second identifying item of information. The method may include associating the first covert marker with the second identifying item of information such that the secure identification card is recognized as authentic only if the association between the first covert marker and the second identifying item of information is recognized. The method may further include storing the association between the first covert marker and the second identifying item of information at a site that can be used to monitor the use of the secure identification card at a plurality of locations. The method may include applying a second covert marker to the secure identification card and associating a second covert marker with the second identifying item of information such that the secure identification card is recognized as authentic only if the association between the second covert marker and the second identifying item of information is recognized. The method may further include storing the association between the second covert marker and the second identifying item of information at a site that can be used to monitor the use of the secure identification card. Applying the first covert marker may include applying a covert marker excitable at a first wavelength. Applying the second covert marker may include applying a covert marker excitable at the first wavelength.

In general, in another aspect, the invention features a secure identification card including a first identifying item of information and a first covert marker. The first covert marker is associated with the first identifying item of information such that the secure identification card is recognized as authentic only when the association between the first covert marker and the first identifying item of information is recognized.

Implementations of the invention may include one or more of the following. The secure identification card may include a second identifying item of information. The first covert marker may be associated with the second identifying item of information such that the secure identification card is recognized as authentic only when the association between the first covert marker and the second identifying item of information is recognized. The secure identification card may include a second identifying item of information and a second covert marker. The second covert marker may be associated with the second identifying item of information such that secure identification card is recognized as authentic only when the association between the second covert marker and the second identifying item of information is recognized. The first covert marker may be excitable at a first wavelength. The second covert marker may be excitable at the first wavelength. The second covert marker may be excitable at a second wavelength.

In general, in another aspect, the invention features a method for authenticating a secure identification card. The method includes reading first covert data from a first covert marker from the secure identification card. The method includes reading first identifying data from a first identifying item of information from the secure identification card. The method includes transmitting the first covert data and the first identifying data to a site that can be used to monitor the use of the secure identification card at a plurality of locations. The method includes determining that an association between the first covert marker and the first identifying item of information is present and in response, returning an authentication signal.

Implementations of the invention may include one or more of the following. Reading the first covert data may include irradiating the secure identification card at a first excitation wavelength.

The method may further include reading second covert data from a second covert marker from the secure identification card. The method may further include reading second identifying data from a second identifying item of information from the secure identification card. The method may further include transmitting the second covert data and the second identifying data to a site that can be used to monitor the use of the secure identification card at a plurality of locations, determining that an association between the second covert marker and the second identifying item of information is present, and in response, returning the authentication signal. Reading the first covert data may include irradiating the secure identification card at a first excitation wavelength and reading the second covert data may include irradiating the secure identification card at the first excitation wavelength. Reading the second covert data may include irradiating the secure identification card at a second excitation wavelength.

In general, in another aspect, the invention features a system including a secure identification card including a first identifying item of information and a first covert marker. The first covert marker is associated with the first identifying item of information such that the secure identification card is recognized as authentic only when the association between the first covert marker and the first identifying item of information is recognized. The system further includes a reader capable of reading data from the first identifying item of information and the first covert marker from the secure identification card. The system further includes a storage device for storing the association between the first covert marker and the first identifying item of information. The system further includes a program for using data from the first identifying item of information and data from the first covert marker to determine that the association is present and indicating that the secure identification card is authentic.

Implementations of the invention may include one or more of the following. The first covert marker may be in a first location on the secure identification card. The secure identification card may include a second covert marker at a second location on the secure identification card. The reader may include a first imager focused on the first location and a second imager focused on the second location. The first covert marker may be in a first location on the secure identification card. The secure identification card may include a second covert marker at a second location on the secure identification card. The reader may include an imager capable of reading data from the first location and the second location.

In general, in another aspect, the invention features a system including a secure identification card including a first identifying item of information and a first covert marker. The first covert marker is associated with the first identifying item of information such that the secure identification card is recognized as authentic only when the association between the first covert marker and the first identifying item of information is recognized. The system includes a reader capable of reading data from the first identifying item of information and the first covert marker from the secure identification card. The system includes a remote system coupled to the reader. The remote system includes a storage device for storing the association between the first covert marker and the first identifying item of information. The remote system includes a program for using data from the first identifying item of information and data from the first covert marker to determine that the association is present, and in response, returning an indication that the secure identification card is authentic.

DETAILED DESCRIPTION

A LumID technology provides the capability to authenticate various components of a single identification document.
Covert Technology Overview—LumID Technology In one embodiment, the LumID method is based on encapsulation of security markers within a silica-based matrix that allows multiple types of covert markers to be used to authenticate object information. In one embodiment, the LumID method is a complete system that includes multi-function secure readers and a Trusted Management System (TMS). In one embodiment, the TMS is remote from the multi-function secure readers and monitors multiple multi-function secure readers.

In one embodiment, the LumID particles are sized to allow the use of relatively standard, low cost application methods to create a security marker on a physical object. Low cost application methods (i.e. printing) rely on ink jet printers, thermal transfer printers, or laser printers. These application methods require particle size below 2 microns, preferably in the nanometer range.

In one embodiment, particle sizes in the submicron range are created by using methods pioneered by Stober, W. STOBER, et al., J. COLLOID INTERF. SCI. 26, 62 (1968), (typically referred to as the "sol gel" process) that use a simple chemical reaction of TEOS (tetra-ethyl ortho silane) with either an acid or base catalyst. In one embodiment, the resulting particle sizes can be controlled as part of the reaction dynamics.

One of the benefits of using the sol gel process to make Lanthanide-based luminescent particles is that organic ligands can be attached to the lanthanides before they are incorporated into the silica matrix. The organic ligands act as "antennas" that absorb light and transfer the energy to the lanthanide and are chosen to enhance the photoluminescence of the lanthanide and allow the excitation of the organo-Lanthanide to be "tuned" to a specific frequency. This allows a common excitation frequency to be used for a marker that has more than one Lanthanide incorporated into it.

In one embodiment, high security dyes, normal luminescent dyes or quantum dots are incorporated into silica beads using the sol gel process. In one embodiment, the dyes and quantum dots are chosen to have a common excitation frequency. Incorporating dyes or quantum dots into silica beads also enhances their stability to environmental factors. In one embodiment, create families of chemicals (lanthanides, dyes and quantum dots) that can be excited by common frequencies and still exhibit composite "colors" or "signatures" that can be readily analyzed are used.

Figure 1:
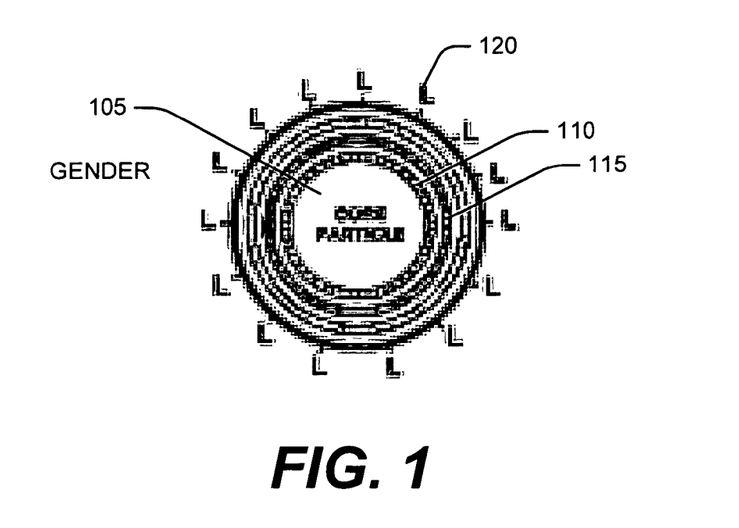
FIG. 1 illustrates a LumID™ particle.

The sol gel process allows control over the process variables that allow different covert security markers to be created. For instance, it is possible to create silica beads that have more than one luminescent molecule type in the same bead or to have "layers" of markers incorporated as separate "shells" on a single silica bead core. M. TRAU and B. J. BATTERSBY, ADV. MATER., 13, No. 12-13, 4 Jul. 2001. An example, shown in FIG. 1, which was taken from Trau (cited earlier in this paragraph), shows a silica bead core 105 surrounded by shells of markers, e.g., 110 and 115, with organic ligands 120 attached. It is also possible to use multiple excitation frequencies for multiple covert LumID seals rather than a single wavelength.

Depending upon the methodology used, either multiple excitation sources are needed or a common source is employed. In one embodiment, different signatures are created by varying the ratios of luminescent chemicals when creating a complex bead.

In one embodiment, once the primary materials have been manufactured (using one or more types of luminescent chemicals in individual silica beads or several luminescent chemicals incorporated into a single bead), the actual covert marker can be created. In one embodiment, a covert marker is a barcode printed using an ink that includes beads with LumID properties. In one embodiment these covert markers can include:

Beads with a single luminescent chemical. Multiple markers are created by varying the concentration of the luminescent chemical in the bead Multiple types of beads, each type with a single luminescent chemical. Markers are created by:
   a) varying the identity of the luminescent chemicals;
   b) varying the relative concentrations of the luminescent chemical in the beads; and
   c) varying the relative proportions of the bead types with respect to one another.

Multiple types of beads, each type with multiple luminescent chemicals. Markers are created by:
   a) varying the identity of the luminescent chemicals;
   b) varying the relative concentrations of the luminescent chemical in the beads;

c) varying the relative concentrations of the luminescent chemicals within a single bead type; and d) varying the relative proportions of the bead types with respect to one another.

The above list assumes that a common excitation source at a single frequency is used. In one embodiment, greater variability is achieved by using multiple excitation sources.

The dependence of the excitation and emission spectra on the internal structure of the bead makes reverse engineering the beads difficult. A single bead could contain a dye, a lanthanide, and a quantum dot, which means that a large number of different beads could be created. Furthermore, a LumID ink can contain multiple bead types, each of which can contain multiple luminescent components, which results in a large number of spectra possible and ensures that LumID beads are difficult to reverse engineer.

LumID Association

Contemporary covert security markers have relied on specifying a mark that is unique to either a company or a product, with or without a specialized reader or a laboratory forensic analysis. This is generally implemented as a "static" marker that has been assigned to an enterprise or a class of products. If the security marker is compromised (either reverse engineered, stolen or mimicked) a new marker has to be created and deployed throughout the supply chain.

In one embodiment, LumID takes advantage of the fact that objects in a supply chain already have one or more items of identifying information associated with them. In most embodiments, this information is encoded in a 2D barcode, with the 2D Datamatrix and PDF417 formats being some of the more popular symbologies (i.e. DoD applications, pharmaceutical labels, government issued ID cards, etc.).

In one embodiment using LumID, covert markers (in large numbers) are created and subsets are assigned to an organization. These covert security markers are "printed" over (or under) the identifying information to be protected from counterfeiting. In one embodiment, to increase the difficulty of counterfeiting the information, a randomized subset is "printed" for the identifying information. In one embodiment, the "printed" security marker is applied as a label over the information (or pre-applied under the identifying information).

Operationally, in one embodiment, the spectral signature is effectively read simultaneously with the 2D barcode, using a dual function barcode/spectrometer reader. In one embodiment, these readers are modifications of existing handheld or fixed mount barcode readers that allow a spectrum to be acquired. The degenerate case is to simply acquire the entire spectrum, but more complex analysis methods can be utilized by altering analysis algorithms under the control of a Trusted Management System (TMS), which is a system that manages the authorization of barcodes.

In another embodiment, the covert mark is implemented as a barcode (preferably 2D) that is read using a dual mode barcode reader. This reader is a relatively simple modification of a "commercially available" 2D barcode reader that allows the covert mark to be irradiated at nearly simultaneously with the reading of the overt 2D mark.

In one embodiment, once the data has been read, the association of the covert security marker and the 2D barcode is encrypted and transmitted to the TMS where the association is stored. Furthermore, in one embodiment, the readers are serialized and must be registered with the LumID system before the data is accepted for processing by the TMS, which further increases the difficulty of compromising the LumID system.

In one embodiment, authentication of identifying information that is specific to an item uses the same methodology. In one embodiment, the identifying information and the covert marker are read simultaneously using a modified barcode reader. In one embodiment, the resulting association is encrypted and transmitted to the TMS where it is compared to the association stored at the TMS for the specific item. If there is a match, a "certificate of authenticity" is returned to the user.

Immigration Traveler Usage Scenario

The Immigration Traveler scenario assumes that each traveler to the United States has in his or her possession a government issued ID that contains the minimum information that is required for the Department of Homeland Security ("DHS") as proposed in "Minimum Standards for Driver's Licenses and Identification Cards Acceptable by Federal Agencies for Official Purposes."

DHS has recommended that "personally identifiable information" that is stored in a Machine Readable Technology (MRT) be encoded in PDF417 2D barcode and, preferably, be encrypted using a "nationwide encryption infrastructure."

Data Elements

In one embodiment of a government issued ID the following data elements are required:

Full legal name;
Date of birth;
Gender;
Driver's license or identification card number;
Digital color photograph;
Address of principal residence;
Signature;
Physical security features designed to prevent tampering, counterfeiting, or duplication of the document for any fraudulent purpose;
Common Machine Readable Technology ("MRT"), with defined minimum data elements;

In one embodiment, the data elements required in a common MRT are:

Full legal name: 125 characters encoded in PDF417;
Driver's license or Identification Card Number;
Expiration date;
Issue date;
Date of birth;
Gender;
Address;

In one embodiment, the Common MRT is encrypted. In one embodiment, the Common MRT is not encrypted.

Card Design

Figure 2:
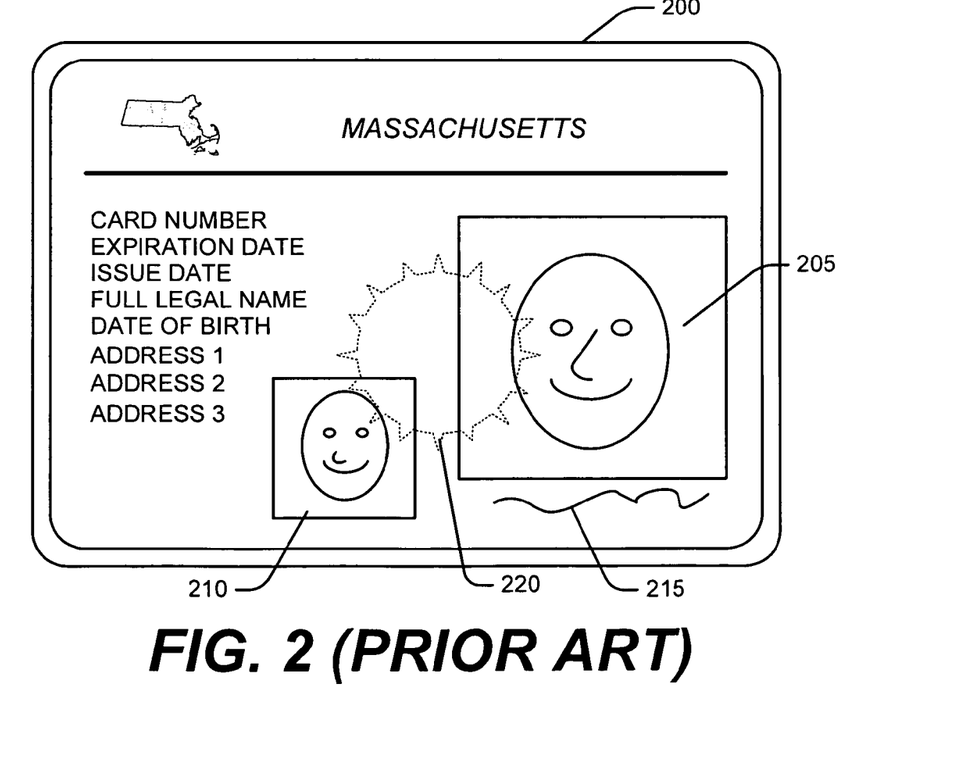
FIGS. 2 and 3 illustrate prior art identification cards.

An embodiment of a Driver's License, a front view of which is illustrated in FIG. 2, has numerous overt and covert security features. It contains duplicate photographic images 205, 210, a signature 215, and a seal 220. These are only a few examples of the security features that can be used in identity cards.

Figure 3:
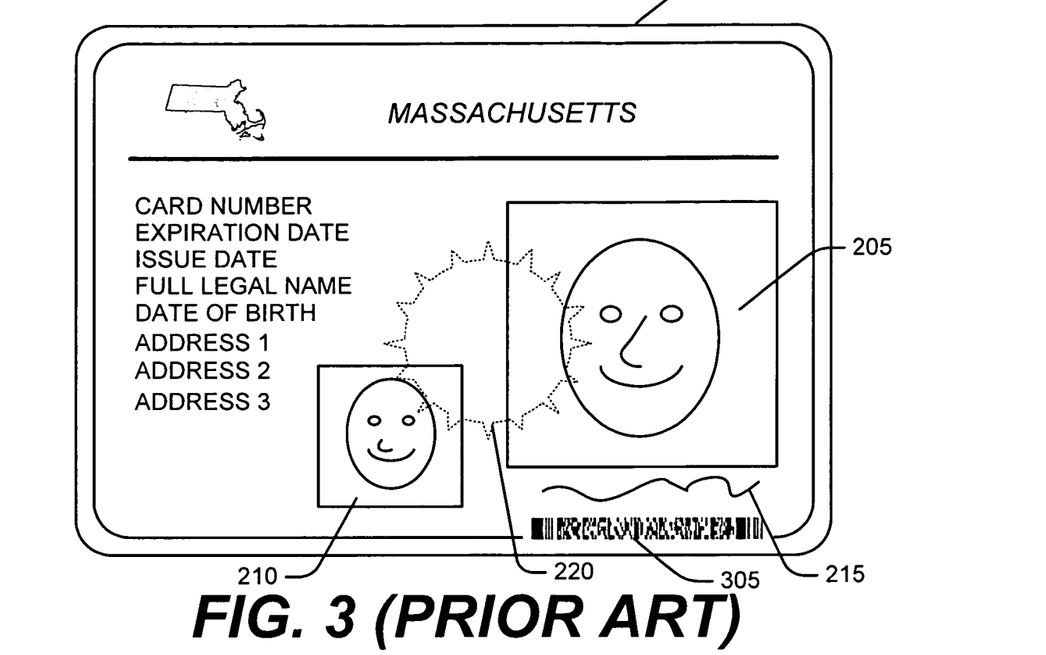

In one embodiment, illustrated in FIG. 3, a Common MRT (in PDF417 symbology) 305 is added to the front of the card, below the large photograph and signature.

ID Card Seal Options

Figure 4:
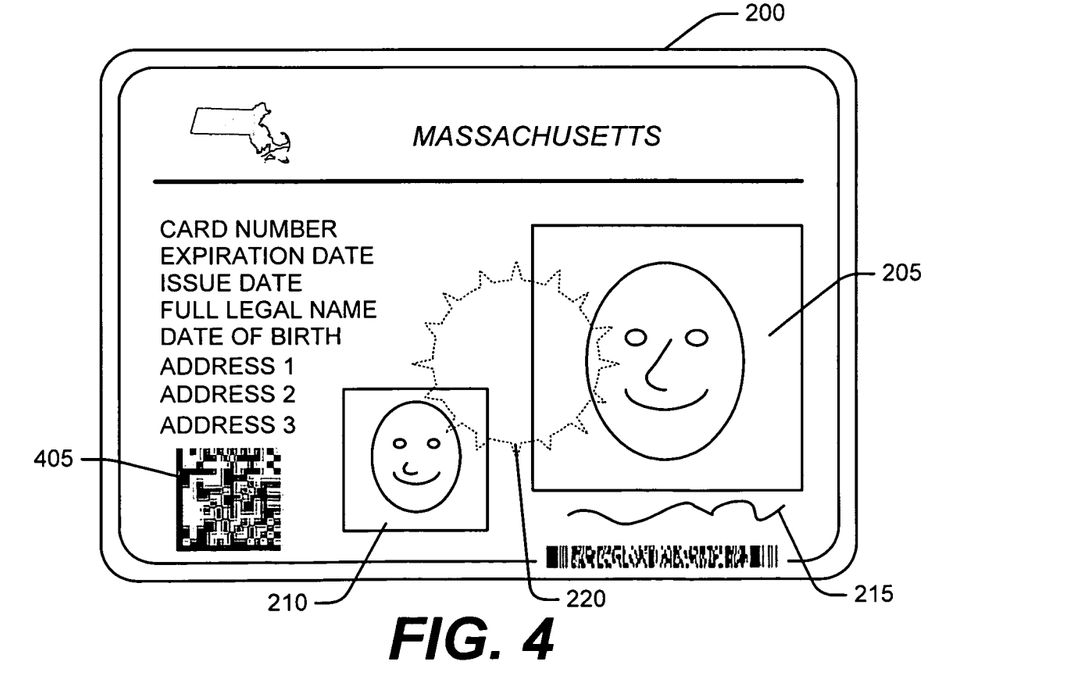
FIGS. 4 and 5 illustrate embodiments of secure identification cards.
Figure 5:
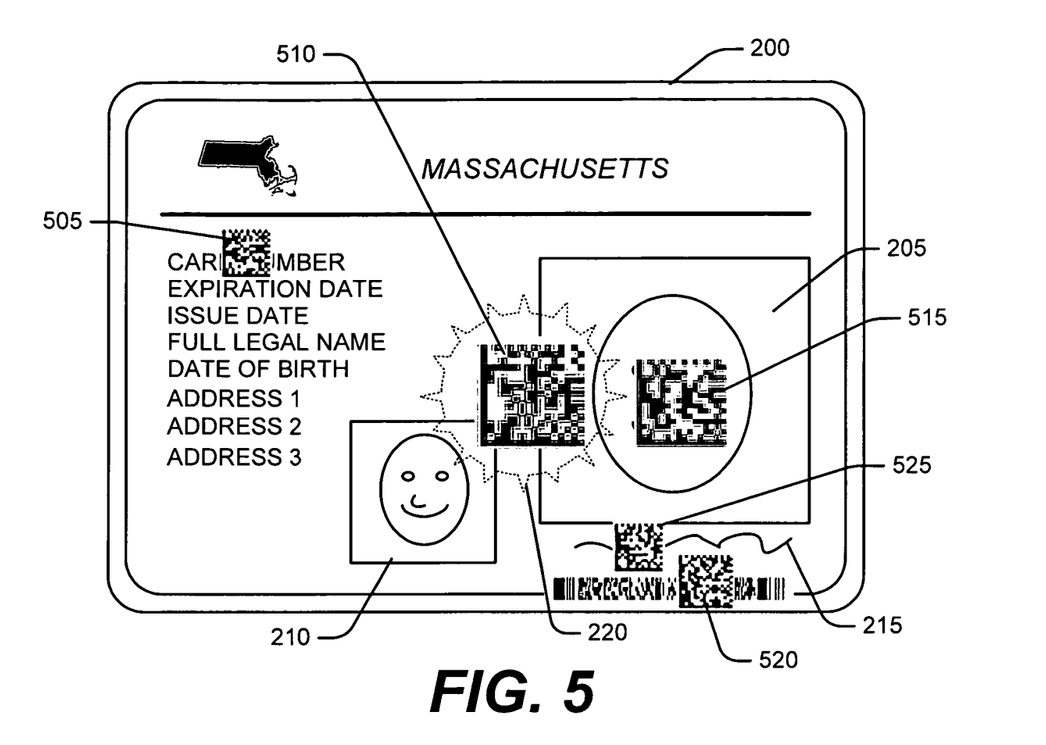

In one embodiment, LumID seals are associated with the information and security features on the ID card in optional configurations. In one embodiment, a LumID seal includes a high density information pattern, such as a barcode, that luminesces at one or more wavelengths when it is radiated by one or more excitation wavelengths. Embodiments of associating one or more seals with one or more security features include:

1. A single LumID seal for all security features, having a common excitation wavelength. An example of this approach is illustrated in FIG. 4 in which LumID seal 405 has been added to the card. The LumID seal 405 is associated with all of the security features on the card.
2. Multiple LumID seals, a different one associated with each security feature, having a common excitation wavelength. An example of this approach is illustrated in FIG. 5, which shows five LumID seals 505, 510, 515, 420 and 425. LumID 505 is associated with the card's card number. LumID 510 is associated with the card's seal 220. LumID 515 is associated with the large photograph 205. LumID 420 is associated with the MRT 215. LumID 425 is associated with the signature 215. In this example, the LumID seals all respond to a common excitation wavelength.
3. Multiple LumID seals, a different one associated with each security feature, each seal having a unique excitation frequency. FIG. 5 is an example of this approach as well, with the difference being that each of the LumID seals responds to a different unique excitation frequency.

In one embodiment, the level of security is greater for option 2 than for option 1 and is greater for option 3 than for option 2. In one embodiment, the cost of implementing option 2 is greater than the cost of implementing option 1 and the cost of implementing option 3 is greater than the cost of implement option 2. In one embodiment, the cost increase is in the additional seals as well as the cost of implementing a reader with multiple excitation wavelengths.

In one embodiment, each of the security features has a unique spatial code created for the instance of the ID card. In other words, even though a feature is common across all ID cards issued for that jurisdiction, a unique LumID seal is created for each unique ID card.

The LumID seals that are created for the ID card are based on a spatial representation of a numeric value that is generated by the jurisdiction at the time the security feature (or, in practice, any feature) is applied to the ID card. The LumID seal is either over- or under-printed on the feature that needs to be protected. Alternatively, the LumID seals could be pre-printed and applied as tamper proof labels, if the card generation process required that.

Reader Design Considerations

The American Association of Motor Vehicle Administrators ("AAMVA") assigns "zones" for the location of information on the ID cards. In one embodiment, large format charge-coupled device ("CCD") imagers acquire data from such cards. In one embodiment, multiple smaller CCD imagers that are focused on specific "information areas" within the AAMVA defined zones. In one embodiment, the imaging system is capable of resolving the overlapping security features that are present on ID cards, as described below.

In one embodiment, the ID card readers are capable of illuminating the card at the appropriate excitation wavelength (or wavelengths in the case of a multiple frequency approach), as well as detecting the luminescent output from the LumID seal. In one embodiment, this is accomplished with LEDs of the appropriate wavelength (either electronically tunable or with simple filters applied to the device).

Figure 6:
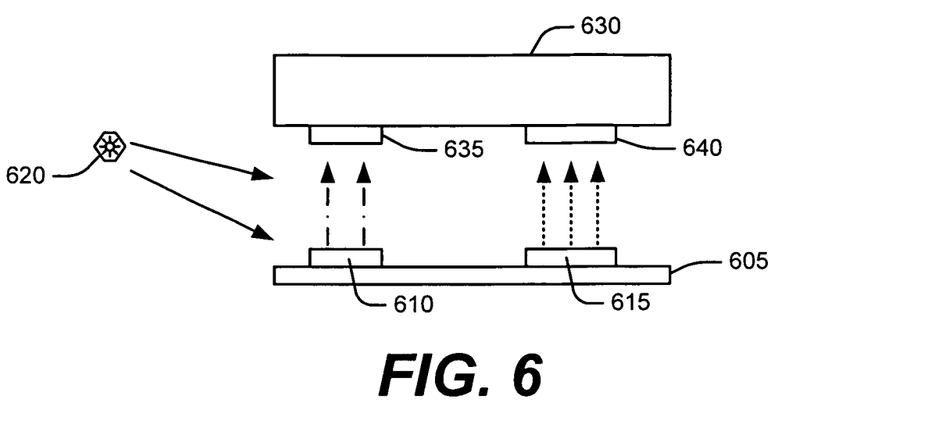
FIGS. 6 and 7 illustrate an embodiment of a secure identification card and a card reader.
Figure 7:
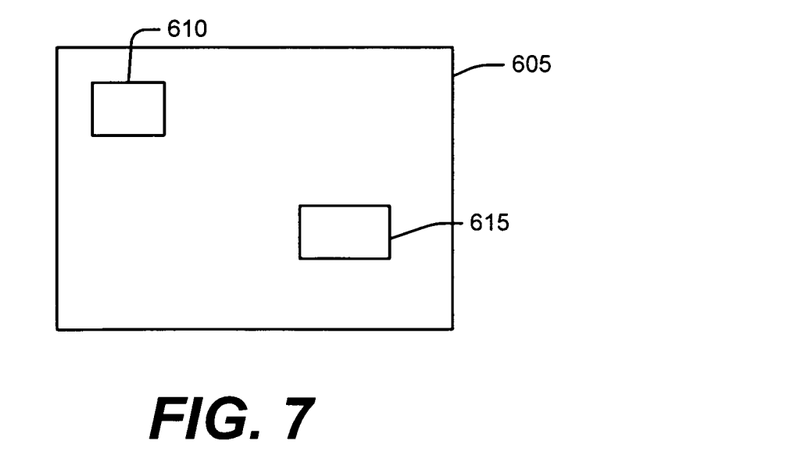

In one embodiment, in which the security feature "sub-zones" are uniform across all implementations of the ID card, a set of small, relatively inexpensive imager integrated circuits ICs would be used. In one embodiment, these imager ICs are placed so that each one covers the area of a specific security (or information) feature, taking into account the error budgets of the physical alignment of the card, the accuracy of print registration and the accuracy of assembly of the reader. An example embodiment, illustrated in FIG. 5, includes a card 605 which has two security feature sub-zones 610 and 615, represented by raised rectangles on the card 605. It will be understood that the security feature sub-zones 610 and 615 are not actually raised on the card, or at least they are not raised to the extent shown in FIG. 6. They are shown in this fashion merely for ease of illustration. FIGS. 6 and 7 show the card 605 and the two security feature sub-zones 610 and 615. The two security feature sub-zones 610 and 615 can be at any location on the card 605, as shown in FIG. 7.

A light source 620 illuminates the ID card 605 causing LumID seals in the security feature sub-zones 610 and 615 to radiate, as indicated by the dashed arrows rising from the security features 610 and 615. The different dash formats indicates that the wavelength of light necessary to cause the LumID seals in the two security feature sub-zones 610 and 615 to radiate may be different and that the resulting radiation from the two security feature sub-zones 610 and 615 may have different wavelengths.

In one embodiment, the light source 620 used to illuminate the ID card is a "white" source. In one embodiment, the light source 620 is a tuned LED source.

A reader 630 includes two imagers 635 and 640. The luminescence from security feature sub-zone 610 would be captured by imager 635 and the luminescence from security feature sub-zone 615 would be captured by imager 640. In one embodiment, the reader would identify the security (or information) feature and buffer the feature and the associated LumID seal.

In one embodiment (not shown), used, for example, in the situation in which the security (or information) features are not placed in well defined sub-zones, a larger imager is taken and the reader electronics use image recognition technology to locate the security (or information) feature. In one embodiment, the resulting x-y coordinates would then be used to locate the LumID seal associated with the security (or information) feature.

A "format type" field is allowed in the AAMVA specification. In one embodiment, the format type field would allow security features on ID cards issued by different jurisdictions to have different locations. In one embodiment, a large, high resolution imager can be used to capture information from alternative placement of features within "zones" on the ID card. In this type of implementation, sufficient pixels are required to allow the appropriate resolution to identify features once the sub-image has been captured.

In one embodiment, the "format" of the card specifies the "color" of the LumID seal. In one embodiment, this allows a further level of security, since the color can be analyzed by a combination of the imagers and reader electronics. One embodiment uses tunable optical filters that could be set to the "color" prescribed in the jurisdiction format field.

Operational Scenario—Common Section

Figure 8:
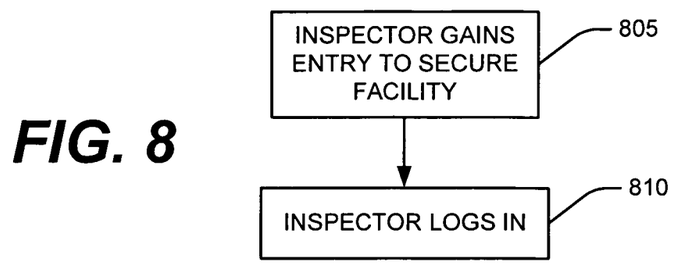
FIGS. 8-10 are flow charts.

Two Operational Scenarios are described. In one embodiment, the initialization of the reading process, described in this section and illustrated in FIG. 8, is common to both scenarios.

In one embodiment, the Government Security Inspector (the "Inspector") gains entry into the secure facility by scanning an ID card with an access control device (block 805). In one embodiment, the access control device is made more secure by including a biometric feature (e.g. fingerprint, eye scan) and a LumID seal on the MRT that is part of the card.

In one embodiment, once the Inspector has assumed his/her position, he/she inserts his/her ID card into the verification station. In one embodiment, the verification station includes a reading device capable of reading the information in an embedded smart card device and comparing this information to a biometric reader (i.e. fingerprint) that is part of the verification station. In one embodiment, the Inspector "logs in" to the verification station (block 810), which establishes the identity of the Inspector and verifies the "role" of the inspector (the role establishes the level of access to data stored on Federal and state databases).

Operational Scenario—Single Excitation Frequency

Figure 9:
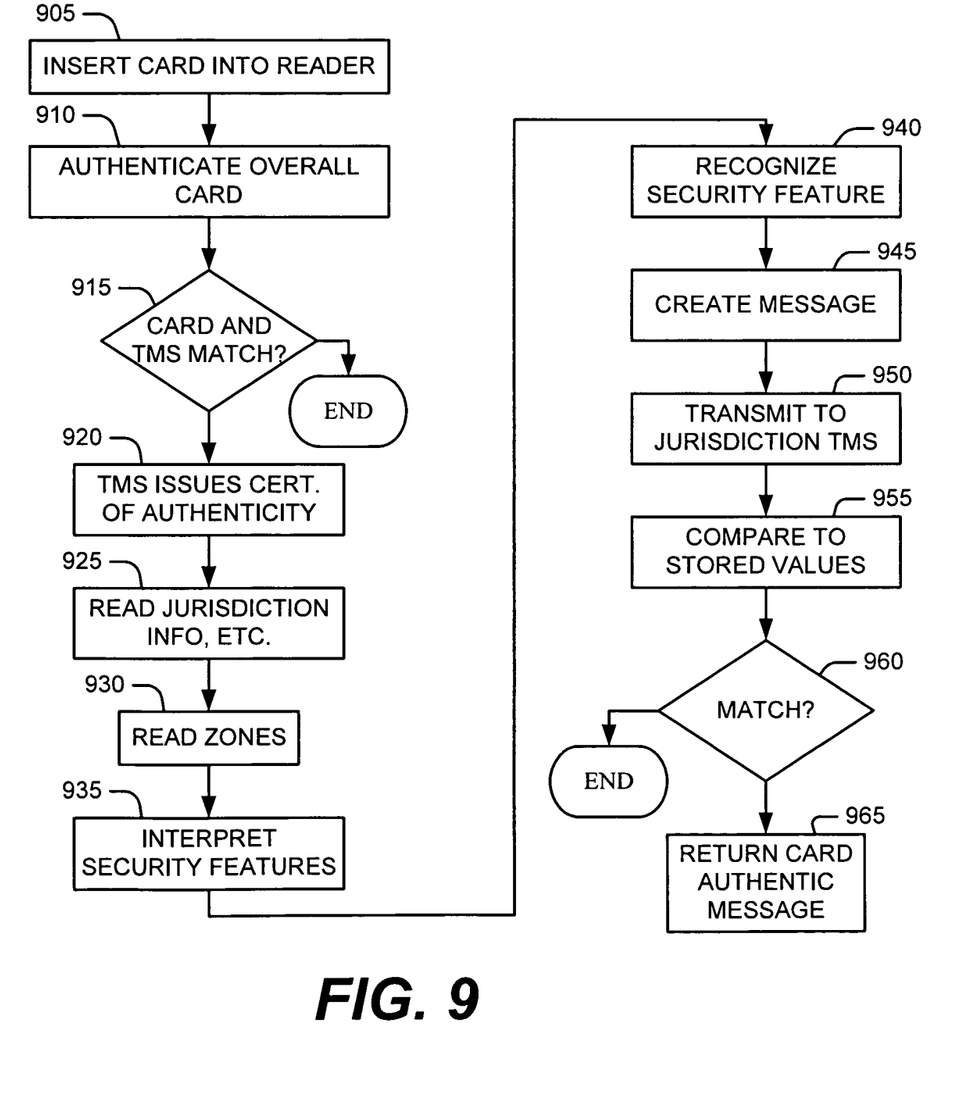

In one embodiment, illustrated in FIG. 9, when an inbound traveler is to be examined, the Inspector requests the Government Issued ID card (the "ID card") and inserts the card into the reader (block 905). In one embodiment, the reader authenticates the overall card (block 910) by comparing the LumID seal and a crypto hash of the Common MRT to that stored at the TMS. In one embodiment, if there is a match (block 915) with the data stored at the TMS, the TMS issues a "certificate of authenticity" to the verification station (block 920).

In one embodiment, for an authentic ID card, the verification station then reads the jurisdiction information (including jurisdiction ID and the version number of the format of the card) and the unique ID number of the card holder (block 925). In one embodiment, the verification station then reads the zones of the ID card (block 930) and interprets the security features using the format version of the card (block 935).

In one embodiment, each security feature has an associated LumID "seal" that is composed of a high density information pattern that luminesces at a "characteristic wavelength." In one embodiment, it is also possible to use multiple excitation frequencies for multiple covert LumID seals rather than a single wavelength. In one embodiment, the verification station recognizes the security feature (block 940) and then creates a message with the jurisdiction ID, the ID card unique ID, the ID of the security feature(s) and the LumID seal(s) (block 945). In one embodiment, this message is transmitted to the "Jurisdiction TMS" after the Inspector verifies his/her identity (again) by using the biometric reader (block 950). In one embodiment, the Jurisdiction TMS can either be located at a separate location or merely be directed to a different server in a single server farm.

In one embodiment, the general format of the message has the following form:

| Jurisdiction ID | Format Version |
| Unique ID | Card Authentic Token |
| Security Feature 1 | LumID seal 1 |
| Security Feature 2 | LumID seal 2 |
| . . . | . . . |
| Security Feature N | LumID seal N |

In one embodiment, once the Jurisdiction TMS has compared the Security Features and the LumID seal to the values in the Jurisdiction TMS database (block 955), a match (block 960) will result in an "authentic ID certificate" being transmitted back to the verification station (block 965).

In one embodiment, the verification station can then also display the Common MRT data, which should match the data visible on the ID card.

Operational Scenario—Multiple Excitation Frequencies

Figure 10:
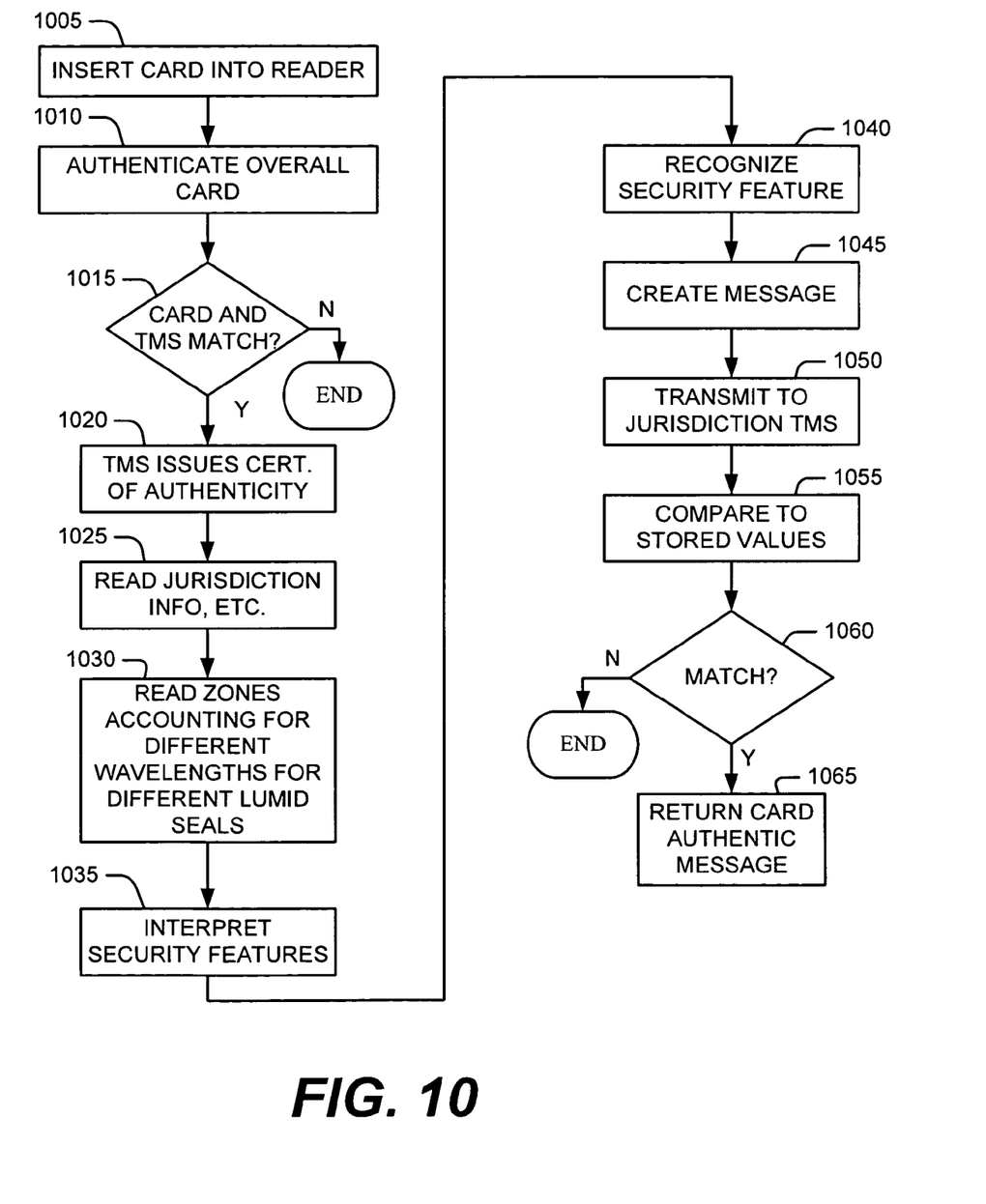

In one embodiment, illustrated in FIG. 10, when an inbound traveler is to be examined, the Inspector requests the Government Issued ID card and inserts the card into the reader (block 1005). In one embodiment, the reader authenticates the overall card (block 1010) by comparing the LumID seal and a crypto hash of the Common MRT to that stored at the TMS. In one embodiment, if there is a match (block 1015) with the data stored at the TMS, the TMS issues a "certificate of authenticity" to the verification station (block 1020).

In one embodiment, for an authentic ID card, the verification station then reads the jurisdiction information (including jurisdiction ID and the version number of the format of the card) and the unique ID number of the card holder (block 1025). In one embodiment, the verification station then reads the zones of the ID card accounting for the fact that different LumID seals within the zones may require different excitation wavelengths and may radiate at different wavelengths (block 1030) and interprets the security features using the format version of the card (block 1035).

In one embodiment, each security feature has an associated LumID "seal" that is composed of a high density information pattern that luminesces at one of the wavelengths that are specified for each feature. In one embodiment, the characteristic wavelengths that are used for each feature are common across all jurisdictions. In one embodiment, each jurisdiction has a specific set of wavelengths. In one embodiment, tunable optical filters are used to generate the specific wavelength required. In one embodiment, the verification station recognizes the security feature (block 1040) and then creates a message with the jurisdiction ID, the ID card unique ID, the ID of the security feature(s) and the LumID seal(s) (block 1045). In one embodiment, this message is transmitted to the "Jurisdiction TMS" (block 1050) after the Inspector verifies his/her identity (again) by using the biometric reader. In one embodiment, the Jurisdiction TMS can either be located at a separate location or merely be directed to a different server in a single server farm.

In one embodiment, the general format of the message has the following form:

| Jurisdiction ID | Format Version |
| Unique ID | Card Authentic Token |
| Security Feature 1 | LumID seal 1 |
| Security Feature 2 | LumID seal 2 |
| . . . | . . . |
| Security Feature N | LumID seal N |

In one embodiment, once the Jurisdiction TMS has compared the Security Features and the LumID seal to the values in the Jurisdiction TMS database (block 1055), a match (block 1060) will result in an "authentic ID certificate" being transmitted back to the verification station (block 1065).

The verification station can then also display the Common MRT data, which should match the data visible on the ID card.

Summary

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating a secure identification card, the secure identification card including a first identifying item of information, the method comprising:

applying a first covert marker to the secure identification card, the first covert marker comprising silica beads encapsulating Lanthinide-based luminescent particles having attached organic ligands, the organic ligands chosen to tune to a specific excitation frequency;

associating the first covert marker with the first identifying item of information such that the secure identification card is recognized as authentic only if the association between the first covert marker and the first identifying item of information is recognized; and storing the association between the first covert marker and the first identifying item of information at a site that can be used to monitor the use of the secure identification card at a plurality of locations;

applying a second covert marker to the secure identification card, the second covert marker comprising beads encapsulating different Lanthinide-based luminescent particles than the first covert marker which are also tuned to the specific excitation frequency;

associating a second covert marker with the second identifying item of information such that the secure identification card is recognized as authentic only if the association between the second covert marker and the second identifying item of information is recognized; and storing the association between the second covert marker and the second identifying item of information at a site that can be used to monitor the use of the secure identification card.

2. The method of claim 1 wherein the organic ligands act to absorb light and transfer energy to the Lanthanide particles allowing an excitation frequency of luminescence of the first covert marker to be tuned to a specific frequency.

3. The method of claim 1 wherein the silica beads are formed by the sol gel process and each bead has a size less than 2 microns.

4. The method of claim 1 wherein the first identifying information is located on a first area of the secure identification card and the first covert marker underlies or overlays the first identifying information.

5. The method of claim 4 wherein the second identifying item of information is located on a second area of the secure identification card and the second covert marker underlies or overlays the second identifying item of information.

6. A secure identification card comprising:
a first identifying item of information; and
a first covert marker comprising silica beads encapsulating Lanthanide-based particles having organic ligands attached to tune to a specific excitation frequency;
the first covert marker being associated with the first identifying item of information such that the secure identification card is recognized as authentic only when the association between the first covert marker and the first identifying item of information is recognized;
a second identifying item of information;
a second covert marker comprising beads with the same luminescent particles as the first covert marker but having a different relative concentration in the beads as the first covert marker;
the second covert marker being associated with the second identifying item of information such that secure identification card is recognized as authentic only when the association between the second covert marker and the second identifying item of information is recognized.

7. The secure identification card of claim 6 wherein:
the first covert marker is excitable at a first wavelength; and
the second covert marker is excitable at the first wavelength.

8. The secure identification card of claim 6 wherein:
the first covert marker is excitable at a first wavelength; and
the second covert marker is excitable at a second wavelength.

9. A method for authenticating a secure identification card, the method comprising:
reading first covert data from a first covert marker from the secure identification card, the covert marker comprising Lanthanide-based luminescent particles having organic ligands attached and encapsulated within a silica-based matrix tuned to a particular frequency;
reading first identifying data from a first identifying item of information from the secure identification card;
transmitting the first covert data and the first identifying data to a site that can be used to monitor the use of the secure identification card at a plurality of locations;
determining that an association between the first covert marker and the first identifying item of information is present; and
in response, returning an authentication signal.

10. The method of claim 9, wherein reading the first covert data comprises:
irradiating the secure identification card at a first excitation wavelength.

11. The method of claim 9 further comprising:
reading second covert data from a second covert marker from the secure identification card;
reading second identifying data from a second identifying item of information from the secure identification card;
transmitting the second covert data and the second identifying data to a site that can be used to monitor the use of the secure identification card at a plurality of locations;
determining that an association between the second covert marker and the second identifying item of information is present; and
in response, returning the authentication signal.

12. The method of claim 11 wherein:
reading the first covert data comprises irradiating the secure identification card at a first excitation wavelength; and
reading the second covert data comprises irradiating the secure identification card at the first excitation wavelength.

13. The method of claim 11 wherein:
reading the first covert data comprises irradiating the secure identification card at a first excitation wavelength; and
reading the second covert data comprises irradiating the secure identification card at a second excitation wavelength.

14. A system comprising:
a secure identification card comprising:
a first identifying item of information; and
a first covert marker, the first covert marker comprising Lanthanide-based luminescent particles having organic ligands attached and encapsulated within a silica-based matrix tuned to a particular frequency;
the first covert marker being associated with the first identifying item of information such that the secure identification card is recognized as authentic only when the association between the first covert marker and the first identifying item of information is recognized;
a reader capable of reading data from the first identifying item of information and the first covert marker from the secure identification card;
a storage device for storing the association between the first covert marker and the first identifying item of information; and
a program for:

using data from the first identifying item of information and data from the first covert marker to determine that the association is present; and indicating that the secure identification card is authentic.

15. The system of claim 14 wherein:

the first covert marker is in a first location on the secure identification card;

the secure identification card further comprises a second covert marker at a second location on the secure identification card;

the reader comprises:

a first imager focused on the first location; and a second imager focused on the second location.

16. The system of claim 14 wherein:

the first covert marker is in a first location on the secure identification card;

the secure identification card further comprises a second covert marker at a second location on the secure identification card;

the reader comprises:

an imager capable of reading data from the first location and the second location.

17. A system comprising:

a secure identification card comprising:

a plurality of identifying items of information; and a plurality of covert markers comprising beads;

each covert marker being associated with an associated identifying item of information such that the secure identification card is recognized as authentic only when the association between each covert marker and the associated identifying item of information is recognized, wherein each covert marker is excitable at a different frequency and at least one covert marker employs Lanthanide-based luminescent particles having organic ligands attached;

a reader capable of reading data from each identifying item of information and an associated covert marker from the secure identification card;

a remote system coupled to the reader, the remote system comprising:

a storage device for storing the association between each covert marker and an associated identifying item of information; and a program for:

using data from each identifying item of information and data from the associated covert marker to determine that the association is present; and in response, returning an indication that the secure identification card is authentic.

* * * * *